Figure 1:
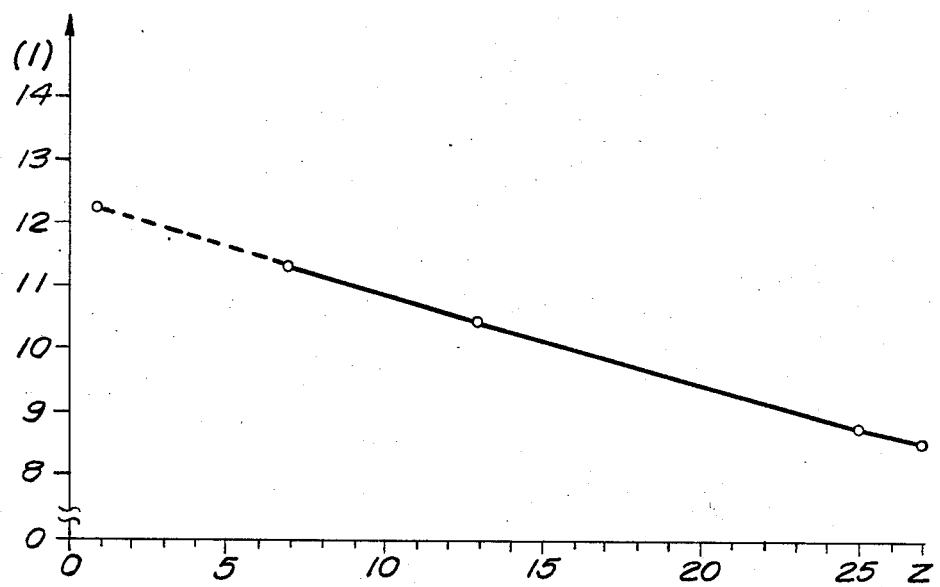

United States Patent [19]

Bogdanovic

[11] Patent Number: 4,695,446

[45] Date of Patent: Sep. 22, 1987

[54] METHOD OF SEPARATING AND PURIFYING HYDROGEN

[75] Inventor: Borislav Bogdanovic, Mulheim an der Ruhr, Fed. Rep. of Germany

[73] Assignee: Studiengesellschaft Kohle mbH, Mulheim an der Ruhr, Fed. Rep. of Germany

[21] Appl. No.: 740,698

[22] Filed: Jun. 3, 1985

Related U.S. Application Data

[63] Continuation-in-part of Ser. No. 626,819, Jul. 2, 1984, which is a continuation of Ser. No. 500,070, Jun. 1, 1983, which is a continuation of Ser. No. 499,140, May 21, 1983, abandoned, which is a continuation of Ser. No. 433,978, Oct. 6, 1982, abandoned, which is a continuation of Ser. No. 187,907, Sep. 17, 1980, abandoned, which is a continuation of Ser. No. 8,739, Feb. 2, 1979, abandoned.

[30] Foreign Application Priority Data

Dec. 22, 1982 [DE] Fed. Rep. of Germany ....... 3247361

[51] Int. Cl.⁴ .............................. C01B 1/32
[52] U.S. Cl. ................. 423/648 R; 423/248; 423/647
[58] Field of Search ........... 423/648 R, 248, 647

[56] References Cited

U.S. PATENT DOCUMENTS

| 1,911,780 | 5/1933 | White et al. | 423/248 |
|---|---|---|---|
| 4,200,623 | 4/1980 | Muller et al. | 423/644 |
| 4,200,624 | 4/1980 | Muller et al. | 423/644 |
| 4,216,198 | 8/1980 | Simons | 423/248 |
| 4,300,946 | 11/1981 | Simons | 423/644 |
| 4,360,505 | 11/1982 | Sheridan et al. | 423/248 |
| 4,368,143 | 1/1983 | de Pous | 423/648 R |
| 4,383,837 | 5/1983 | Smith | 423/248 |
| 4,389,326 | 6/1983 | Tanguy et al. | 423/645 |
| 4,431,561 | 2/1984 | Oushinsky et al. | 423/648 R |

FOREIGN PATENT DOCUMENTS

| 0003564 | 8/1979 | European Pat. Off. | |
| 115691 | 9/1975 | Japan | 423/248 |
| 634799 | 3/1950 | United Kingdom | 75/0.5 B |
| 628180 | 9/1978 | U.S.S.R. | 75/0.5 B |

OTHER PUBLICATIONS

U.S. Patent Application Ser. No. 770,355, filed Feb. 22, 1977.

*Primary Examiner*—John Doll
*Assistant Examiner*—Wayne A. Lange
*Attorney, Agent, or Firm*—Sprung Horn Kramer & Woods

[57] ABSTRACT

A method of separating hydrogen from mixture with at least one gas selected from the group consisting of methane and its higher homologs, nitrogen, noble gases, CO, $CO_2$, $O_2$, $NH_3$, $H_2O$, and $H_2S$, comprising contacting the mixture with active magnesium thereby selectively to absorb the hydrogen by forming magnesium hydride, separating the unabsorbed gas from the magnesium hydride, heating the magnesium hydride thereby to desorb the hydrogen in purified form and regenerate active magnesium from the hydride, and recovering the desorbed hydrogen.

6 Claims, 1 Drawing Figure

METHOD OF SEPARATING AND PURIFYING HYDROGEN

This application is a continuation-in-part of Ser. No. 626,819 filed July 2, 1984, now pending, which is a continuation of Ser. No. 500,070 filed June 1, 1983, now pending, which is a continuation of Ser. No. 499,140, filed May 21, 1983, now abandoned, which is a continuation of Ser. No. 433,978, filed Oct. 6, 1982, now abandoned, which is a continuation of Ser. No. 187,907 filed Sept. 17, 1980, now abandoned, which is a continuation of Ser. No. 008,739, filed Feb. 2, 1979, now abandoned.

The present invention concerns a method of separating hydrogen from hydrogenous mixtures of gases and purifying it.

The present state of the art for separating hydrogen from hydrogenous gases and purifying it involves absorption or adsorption (including alternating-pressure adsorption) methods and methods based on the cryogenic distillation or condensation and diffusion of the gases through semipermeable membranes (Heck & Johansen, *Hydrocarb. Proc.*, January 1978, 175 and Werner, *Chem.-Ing.-Techn.* 53 [2], 73 [1981]).

Since these methods of separating and purifying hydrogen require relatively high investment and operating costs and account for a considerable portion of the overall costs of the manufacture of hydrogen, economically and technically optimal solutions for the various separation and purification applications have had to be sought. The reversible reaction of hydrogen with certain metals, metal alloys, or intermetallic compounds $$M + \frac{x}{2} H_2 \longrightarrow MH_x \quad (1)$$

in which M is a metal, metal alloy, or intermetallic compound has for several years been proposed and investigated as a potential basis for the enrichment or purification of hydrogen (Snape & Lynch, *CHEMTECH*, December 1980, 768; Sandrock & Huston, *CHEMTECH*, December 1981, 754; Huston & Sheridan, *ACS Symp. Ser.* 1981, 223 [1964]).

Huston and Sheriden regard hydrogen-separation based on the metal hydrides as technologies that would complement cryogenic or adsorption methods, with the specificity of the reaction in Equation 1 offering particular advantages for lean hydrogen streams with respect to the yield and purity of the resulting hydrogen. These lean streams ("off-gas streams") accompany certain refinery processes for example and have not as yet been economically exploited. $Fe_xTiNi_{1-x}$ alloys have been successfully employed to obtain complete separation of hydrogen from the methane in mixtures of these gases containing 10–50% hydrogen (Cholera & Diaspow, *Proc. 12th Intersociety Energy Convers. Eng. Conf.* 1976 [1], 981).

The prerequisite for the successful application of metal-hydride-and-metal systems to the separation and purification of hydrogen is that the hydrogenation will proceed with acceptable kinetics even under relatively low partial hydrogen pressures and will not be inhibited by any contaminants like $CO$, $CO_2$, $O_2$, $H_2O$, and $NH_3$ that may be present in the hydrogen.

The disadvantages of the known intermetallic systems that are employed for the separation, purification, and storage of hydrogen are their relatively low $H_2$ capacities (1.5–1.7% by weight) and resultingly high investment and materials costs.

Hence, there exists as yet no technical solution that is satisfactory from the aspect of economics and efficiency to the problem of employing metal-hydride-and-metal systems to enrich and purify hydrogen.

It has however been discovered, surprisingly, that an active form of metallic magnesium is appropriate as a hydride producer in satisfying the demands on the metal-and-metal-hydride systems used for separating and purifying hydrogen. Magnesium manufactured by the method specified in European Pat. No. 0 003 564, corresponding to U.S. application Ser. No. 8,739, filed Feb. 2, 1979, now abandoned, which was superseded by application Ser. No. 187,907, filed Sept. 17, 1980, now pending, which is the basis for continuation-in-part application Ser. No. 433,078, filed Oct. 6, 1982, now abandoned, which was superseded by application Ser. No. 626,819, filed July 2, 1984, now pending, and then thermally dehydrogenated is especially appropriate as an active form of magnesium in the sense of the method disclosed herein. The method involves homogeneous catalysis in which the magnesium is converted with hydrogen in the presence of a catalyst consisting of a halide of a metal of Subgroups IV-VIII of the periodic table and of a magnesium-organic compound or magnesium hydride, in the presence of a polycyclic aromatic or tertiary amine if necessary, and in the presence of a magnesium halide, $MgX_2$, in which $X = Cl$, $Br$, or $I$.

Magnesium that has been obtained by dehydrogenating magnesium hydrides manufactured by the homogeneous catalytic method and doped with transition metals is also an active form. Magnesium hydrides can be doped with transition metals by exposing a finely divided form of magnesium hydride or metallic magnesium to a solution of a transition metal complex or transition-metal organic compound, in the presence of hydrogen if necessary, leading to magnesium-hydride or magnesium systems for storing hydrogen that exhibit better hydrogenation and dehydrogenation systems than the active magnesium hydride manufactured by the method disclosed in European Pat. No. 0 003 564.

The elements of Subgroups IV-VIII of the periodic table, especially titanium, vanadium, chromium, molybdenum, tungsten, iron, ruthenium, cobalt, rhodium, iridium, nickel, palladium, and/or platinum are employed as transition metals in this method. Preferred transition-metal complexes or transition-metal organic compounds are bis-(cyclooctadiene-1,5)-nickel ($COD_2Ni$), bis-($\eta^3$-allyl)-nickel, tetracarbonylnickel, bis-(acetylacetonato)-nickel, bis-(ethylato)-nickel or phosphane-nickel complexes and bis-($\eta^3$-allyl)-palladium, palladium-phosphane complexes, tris-($\eta^3$-allyl)-iron, ferrocene, or iron carbonyls.

Some variations of the doping process in which an elementary transition metal is produced and precipitated in an extremely fine distribution on the surface of the particles of magnesium hydride or magnesium include for example:

(a) doping by thermal decomposition of a dissolved transition-metal complex $$MgH_2 + COD_2Ni \xrightarrow[-2COD]{100-110°\ C.} MgH(Ni)$$

(b) doing by hydrogenation of the transition-metal complex

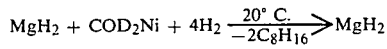

(c) doping by direct reaction of the magnesium hydride with the transition-metal compound

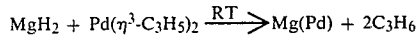

(d) doping by reducing the transition-metal complex with magnesium hydride

where X is a complex-producing ligand, (acetylacetonate)$^{(-)}$ for example.

Other forms of magnesium that are also specified in the patent or application as being obtained by doping or dehydrogenation can also be employed as active forms in the sense of the method specified herein. The common characteristic of all these active forms of magnesium is their high reactivity to hydrogen, meaning that they react with hydrogen to form the magnesium hydrides even subject to relatively mild reaction conditions (1–3 bars of $H_2$ pressure and a temperature of 150–200° C.).

The present method of separating and purifying hydrogen commences with exposing such an "active magnesium" to hydrogenous gases, which may contain not only hydrogen itself but also methane and its homologs, nitrogen, and the noble gases, until it selectively absorbs the hydrogen, forming a magnesium hydride and leaving only a slight percentage behind. The resulting hydride is then dehydrogenated to obtain the purified hydrogen, with, incidentally, the "active magnesium" reappearing so that it can be recharged with hydrogen. The method leads to a single-stage and practically complete separation of hydrogen from mixtures of gases the other components of which are inert to "active magnesium" and magnesium hydrides.

The decisive advantages of the present method are, first, that the "active magnesium" can be hydrogenated even at low partial hydrogen pressures, in, that is, hydrogen-poor gas mixtures, at an acceptable rate and, second, that the hydrogenation kinetics will be affected insignificantly or not at all by the contaminants—CO, $CO_2$, $O_2$, $NH_3$, $H_2O$, and $H_2S$, normally present in hydrogen. These hydrogen contaminants will either be irreversibly absorbed during the hydrogenation of the "active magnesium" or converted into products that will remain in the residual gas subsequent to hydrogenation. Traces of $H_2O$ and $O_2$ for example in the hydrogen or hydrogenous mixture will be irreversibly absorbed during hydrogenation, whereas CO will be converted into methane and after hydrogenation will remain in the residual gas (Ex. 3 & 4). Pure hydrogen will be obtained in any case when the resulting magnesium hydrides are dehydrogenated. The present method thus enables the purification of hydrogen of even slight volumes of not only the "inert" ($CH_4$ and its homologs, $N_2$, and the noble gases) but also the "reactive" gases (CO, $CO_2$, $O_2$, $NH_3$, $H_2O$, and $H_2S$), accompanied in the latter case by a slow decrease in the hydrogen-storage capacity of the "active magnesium."

Other advantages of the present method are the high hydrogen-storage capacity of the "active magnesium" (6–7.5% by weight of $H_2$) and the low price of magnesium in comparison to intermetallic compounds (FeTi, LaNi$_5$, etc.).

The method can be employed with particular advantage in the following cases:

1. The separation of hydrogen from hydrogen-poor gas mixtures that contain not only hydrogen but also methane and its homologs, nitrogen, the noble gases, and possibly slight volumes of CO, $CO_2$, $O_2$, $NH_3$, $H_2O$, and $H_2S$.
2. The purification of hydrogen of slight volumes of not only the "inert" ($CH_4$ and its homologs, $N_2$, and the noble gases) but also the "reactive" gases (CO, $CO_2$, $O_2$, $NH_3$, $H_2O$, and $H_2S$).

The reaction conditions for charging the "active magnesium" with hydrogen or for discharging the magnesium hydrides of hydrogen can be varied over a wide range. Preferred reaction conditions for charging are temperatures of 150°–400° C. and partial hydrogen pressures of 0.1–100 bars. Those for discharging are temperatures of 250°–450° C. and hydrogen-equilibrium pressures of 0.37–40 bars.

The invention will now be specified with reference to the following examples.

Technical-grade hydrogen (99.9% pure with a residue of max. 10 ppm of $O_2$, max. 1000 ppm of $N_2$, and max. 100 ppm of $H_2O$) was used for the trials. The hydrogen was mixed with $CH_4$ or CO in the desired ratio in a pressure vessel. Fresh supplies of $H_2$ and $CH_4$— or $H_2$ and CO were obtained from the pressure vessel for each hydrogenation and dehydrogenation cycle.

EXAMPLE 1

15.0 kg (617 moles) of powdered magnesium (50 mesh) were hydrogenated into magnesium hydride in 75 l of absolute THF in a stirrer vessel by the method specified in European Pat. No. 0 003 564 in the presence of a titanium catalyst (Mg:TiCl$_4$:anthracene=100:1:1) at 60°–73° C. and under 2 bars of $H_2$ pressure. The hydride was doped with nickel by replacing the hydrogen atmosphere of the vessel with argon, adding 1.4 kg (5 moles) of solid bis-(1,5-cyclooctadiene)-nickel (COD$_2$Ni) to the suspension of magnesium hydride in THF, and stirring the contents for 4 hours at 100° C. The nickel-doped magnesium hydride was then filtered out, washed with THF and pentane, and dried in a vacuum (0.2–0.4 mbars) at 50° C. The resulting product was subjected to a dehydrogenation and hydrogenation cycle (dehydrogenation at 230°–370° C. and 10–0.4 bars and hydrogenation at 335°–350° C. and 5–10 bars) to clear it of any residual organic materials. The yield was 14.0 kg of magnesium hydride in the form of a light-gray pyrophoric powder composed of C 0.0, H 6.01, Mg 85.17, Ti 1.51, Cl 2.72, and Ni 0.89%.

A 15.2-g sample of this hydride was dehydrogenated in a 300-ml stainless-steel autoclave at 372° C. and normal pressure into "active magnesium." A mixture of $CH_4$ and $H_2$ containing 14.2% by volume of the $H_2$ (the remainder being $CH_4$) was pumped into the autoclave at 227° C. (autoclave temperature) until the pressure equaled 10 bars, whereupon the temperature of the sample increased briefly to 231° C. After 1 hour and 10 minutes at 227° C. the autoclave pressure was reduced to normal and the gas pumped out and analyzed. Mass spectrometry revealed that the gas retained only 1.9% by volume of $H_2$ (with the remainder being $CH_4$), which approximates the calculated equilibrium pressure of hydrogen over magnesium hydride at 227° C. (calc. 1.5% $H_2$ by vol.). The "active magnesium" was hydrogenated with the mixture of $CH_4$ and $H_2$ and the unconverted gas mixture bled off at the same temperature another 36 times at varying pressure and hydrogenation time. The valve was opened and closed with fully automatic electronic controls connected to the autoclave. Table 1 shows the results.

TABLE 1

| Hydrogenation cycle no. | Pressure [bars] | Hydrogenation time [hours] | Mole % of $H_2$ in res. gas |
|---|---|---|---|
| 2 | 10 | 2.4 | 2.6 |
| 3 | " | 0.33 | 4.1 |
| 4 | " | 12 | 2.4 |
| 5 | 15 | 1.6 | 1.9 |
| 6 | " | 0.33 | 2.6 |
| 7 | " | 4 | 1.4 |
| 8 | " | 12 | 1.2 |
| 9 | " | 1.5 | 2.1 |
| 10 | " | " | 2.3 |
| 11 | " | " | 2.2 |
| 12–21 | " | " | —$^a$ |
| 22 | " | " | 9.8 |
| 23–36 | " | " | —$^a$ |
| 37 | " | " | 12.5 |

$^a$Not measured.

The autoclave was then cooled to 30° C. and evacuated to 0.1 mbars. Slowly heating the autoclave to 363° C. under normal pressure produced 9.32 l of gas (20° C. and 1 bar) within 1 hour. One sample of the gas was analyzed by mass spectrometry at the commencement and one toward the end of its formation. These samples contained 100.0% hydrogen. From the volume of hydrogen that formed it was calculated that 66% of the storage capacity of the "active magnesium" had been exploited in this test. 14.3 g of the "active magnesium" were recovered.

EXAMPLE 2

The procedure described in Example 1 was followed except that the temperature of the mixture of $CH_4$ and $H_2$ (14.3% $H_2$ by vol.) was 196° C. and its pressure was 15 bars. 14.3 g of the magnesium hydride described in Example 1, doped with 0.89% nickel, was employed. The hydrogenation times were 2 hours. Hydrogenation was repeated 23 times. Table 2 shows the hydrogen content of the unreacted gas after some of the hydrogenation processes.

TABLE 2

| Hydrogenation cycle no. | Mole % of $H_2$ in res. gas* |
|---|---|
| 1 | 0.7 |
| 2 | 0.6 |
| 11 | 1.4 |
| 13 | 2.7 |
| 23 | 12.6 |

*An equilibrium concentration of $H_2$ over $MgH_2$ of 0.3 mole % was calculated for 196° C. and 15 bars.

Discharging the storer at 362° C. resulted in 8.46 l of gas (20° C. and 1 bar) that mass spectrometry revealed to consist of almost 100.0% hydrogen ($CH_4$: 0.1%). About 60% of the storer capacity had been exploited in this test. The recovered "active magnesium" was composed of C 1.04, H 1.38, Mg 94.42, Ti 1.52, Cl 0.71, and Ni 0.69%.

EXAMPLE 3

17.6 g of magnesium hydride produced as in Example 1 and doped with 0.89% nickel was dehydrogenated into "active magnesium" in a 300-ml stainless-steel autoclave at 338° C. and under normal pressure (releasing 11.7 l of $H_2$ at 20° C.). Hydrogen containing 1 mole % carbon monoxide (by mass spectrometry) was then pumped into the autoclave at 338° C. to a pressure of 10 bars, which was maintained constant with a reduction valve, the autoclave being replenished with hydrogen from a pressurize reservoir. During hydrogenation the temperature of the sample rose briefly to 373° C., remained at 366° C. for about 70 minutes, and then dropped back to 338° C. A hydrogen uptake of 12.5 l (20° C. and 1 bar) was measured during this time. The autoclave was then cooled to 38° C. and evacuated, yielding 1.35 l of gas (20° C. and 1 bar). Mass spectrometry of this gas showed it to be composed of 89.3 mole % $H_2$ and 8.1 mole % $CH_4$ (the remainder being argon and air). The volume of methane that had formed corresponded practically quantitatively to that of the carbon monoxide (12.5 l) present in the original $H_2$. The autoclave was then evacuated to 0.2 mbars and reheated 338° C. The magnesium hydride was dehydrogenated at this temperature for about 79 minutes at normal pressure, yielding 13.3 l of a gas (20° and 1 bar) that mass spectrometry revealed to be pure hydrogen.

The "active magnesium" was hydrogenated with hydrogen mixed with 1 mole % of carbon monoxide at 10 bars and the resulting magnesium hydride dehydrogenated at normal pressure and a constant autoclave temperature of 338° C. another 27 times, the valve being opened and closed with completely automatic controls connected to the autoclave. The nominal hydrogenation times were 3 hours and the nominal dehydrogenation times 2 hours. The effective hydrogenation times were about 1.5 hours and the effective dehydrogenation times about 1 hour. The temperature of the sample increased during each hydrogenation to 370°–373° C. and decreased to about 300° C. during each dehydrogenation. 11.3 l of gas were released during the 7th dehydrogenation, 10.5 during the 13th, 8.8 during the 25th, and 8.5 during the 27th (20° C. and 1 bar). Mass spectrometry of the gas from the 27th dehydrogenation revealed pure hydrogen. The gas remaining in the autoclave after the 2nd hydrogenation (1.35 l at 20° C. and 1 bar) consisted of 91.6 mole % $H_2$ and 6.7 mole % $CH_4$ and the gas remaining in the autoclave after the 27th hydrogenation of 93.2 mole % $H_2$ and 5.7 mole % $CH_4$.

Plotting the volume of $H_2$ released during each cycle against the number of cycles results in the straight line illustrated in FIG. 1. The capacity of the storer had dropped to about 70% of its original level after 27 cycles. This decrease results from the conversion of the carbon monoxide originally mixed in with the hydrogen into methane, the oxygen from the monoxide getting bound by the "active magnesium," probably into magnesium oxide. It is worth noting that at 1% carbon monoxide—and the resulting steady decrease in storer capacity—only a very insignificant deterioration in the dehydrogenation and hydrogenation kinetics was observed after the 27th cycle.

The recovered "active magnesium" was composed of C 0.0, H 0.34, Mg 93.10, Ti 1.55, Cl 2.86, and Ni 0.89%.

EXAMPLE 4

218.8 g (9.0 moles) of powdered magnesium were hydrogenated into magnesium hydride in 1.1 l of THF by the method specified in European Patent No. 0 003 564 with a titanium catalyst ($Mg:TiCl_4$:anthracene = 100:1:1) at 60° C. and 2 bars. The product was filtered out, washed with THF and pentane, and dried in a high vacuum to constant weight. The yield was 250 g of magnesium hydride composed of C 4.70, H 7.36, Mg 83.68, Ti 0.46, and Cl 2.05%.

A 16.0-g sample of this magnesium hydride was dehydrogenated into "active magnesium" in a 300-ml stainless-steel autoclave in vacuum (0.2 mbars) while the autoclave temperature was slowly (about 2° C. a minute) increased to 373° C. Gas started to form at about 270° C. 12.8 l of a gas (20° C. and 1 bar) that mass spectrometry revealed to contain slight percentages of n-butenes (2–3%) and THF (0.5%) in addition to hydrogen had formed by the time formation stopped. Hydrogen mixed with 2.3 mole % carbon monoxide (by mass spectrometry) was then pumped into the autoclave at 338° C. to 10 bars, a pressure that was maintained constant with a reduction valve, the autoclave being replenished with hydrogen from a pressurized reservoir. During hydrogenation the temperature of the sample rose briefly to 366° C., dropped to 355° C. in the course of 1 hour, and then to 338° C. again. Mass spectrometry showed the residual gas (11.2 l at 20° C. and 1 bar) remaining over $MgH_2$ in the autoclave to be composed of 82.9 mole % of $H_2$ and 15.8 mole % of $CH_4$ (with the rest being $N_2$). The autoclave was then cooled to 30°–40° C. and evacuated to 0.2 mbars. The magnesium hydride was dehydrogenated at 338° C. and normal pressure, yielding 11.2 l of hydrogen (20° C. and 1 bar). The "active magnesium" was hydrogenated with hydrogen mixed with 2.3 mole % of carbon monoxide at 10 bars and the resulting magnesium hydride dehydrogenated at normal pressure and a constant autoclave temperature of 338° C. another 25 times, the valve being opened and closed with completely automatic controls connected to the autoclave.

The nominal hydrogenation times were 3 hours and the nominal dehydrogenation times 2 hours. The effective sample hydrogenation times were about 1.3 hours and the effective dehydrogenation times about 2 hours. The temperature of the sample increased during each hydrogenation to 370° C. and decreased to about 325° C. during each dehydrogenation. 5.9 l of gas were released during the 8th dehydrogenation, 4.9 during the 12th, and 2.4 during the 26th (20° C. and 1 bar). The gas remaining in the autoclave after the 2nd hydrogenation (1.35 l at 20° C. and 1 bar) consisted of 85.5 mole % $H_2$ and 12.9 mole % $CH_4$. The recovered "active magnesium" (16.0 g) was composed of C 2.72, H 1.53, Mg 77.82, Ti 1.10, and Cl 1.13%.

It will be understood that the specification and examples are illustrative but not limitative of the present invention and that other embodiments within the spirit and scope of the invention will suggest themselves to those skilled in the art.

What is claimed is:

1. A method of absorbing hydrogen comprising (a) thermally dehydrogenating magnesium hydride that has been doped with a transition metal by contacting a finely divided form of magnesium hydride with a solution of a transition metal organic compound so that the elementary transition metal precipitates in an extremely finely divided form on the surface of the particles of magnesium hydride, said transition metal being of subgroups IV–VIII of the Period Table, and the removing the solution, thereby yielding active magnesium, and (b) contacting the active magensium with hydrogen, thereby selectively to absorb the hydrogen by forming magnesium hydride, heating the magnesium hydride thereby to desorb the hydrogen in purified form and regenerate active magnesium from the hydride, and recovering the desorbed hydrogen.

2. The method according to claim 1, wherein the active magnesium is contacted with the hydrogen at a temperature of about 150°–400° C. and a hydrogen pressure of about 0.1–100 bars, and desorption of hydrogen is effected at a temperature of about 250°–450° C. and a hydrogen-equilibrium pressure of about 0.37–40 bars.

3. A method of absorbing hydrogen comprising (a) thermally dehydrogenating a magnesium hydride that has been doped with a transition metal by contacting a finely divided form of metallic magnesium with a solution of a transition metal organic compound, so that the elementary transsistion metal precipitates in an extremely finely divided form on the surface of the particles of magnesium, said transition metal being of subgroups IV–VIII of the Periodic Table, thereby yielding active magnesium and (b) contacting the active magnesium with hydrogen, thereby selectively to absorb the hydrogen by forming magnesium hydride, heating the magnesium hydride thereby to desorb the hydrogen in pruified form and regenerate active magnesium from the hydride, and recovering the desorbed hydrogen.

4. The method according to claim 3, wherein the active magnesium is contacted with the hydrogen at a temperature of about 150°–400° C. and a hydrogen pressure of about 0.1–100 bars, and desorption of hydrogen is effected at a temperature of about 250°–450° C. and a hydrogen-equilibrium pressure of about 0.37–40 bars.

5. A method of absorbing hydrogen comprising contacting the hydrogen with active magnesium wherein the active magnesiuum initially contacted with the hydrogen is metallic magnesium obtained by thermally dehydrogenating a magensium hydride that has been doped with a transition metal by reacting magnesium with hydrogen in an organic solvent in the presence of anthracene and a halide of a transition metal of the IVth to VIIIth Subgroup of the Periodic Table, thereby selectively to absorb the hydrogen by forming magnesim hydride, heating the magnesium hydride thereby to desorb the hydrogen in purified from and regenerate active magnesium from the hydride, and recovering the desorbed hydrogen.

6. The method according to claim 5, wherein the active magnesium is contacted with the gas mixture at a temperature of about 150°–400° C. and a hydrogen pressure of about 0.1–100 bars, and desorption of hydrogen is effected at a temperature of about 250°–450° C. and a hydrogen-equilibrium pressure of about 0.37–40 bars.

* * * * *